(12) United States Patent
Sakaguchi et al.

(10) Patent No.: US 9,786,886 B2
(45) Date of Patent: Oct. 10, 2017

(54) NONAQUEOUS BATTERY

(71) Applicant: Automotive Energy Supply Corporation, Zama-shi, Kanagawa (JP)

(72) Inventors: Shinichiro Sakaguchi, Fujisawa (JP); Masatomo Mizuta, Kawasaki (JP)

(73) Assignee: AUTOMOTIVE ENERGY SUPPLY CORPORATION, Zama-shi (JP)

( * ) Notice: Subject to any disclaimer, the term of this patent is extended or adjusted under 35 U.S.C. 154(b) by 126 days.

(21) Appl. No.: 14/282,587

(22) Filed: May 20, 2014

(65) Prior Publication Data

US 2014/0363732 A1    Dec. 11, 2014

(30) Foreign Application Priority Data

Jun. 7, 2013    (JP) ................. 2013-120545

(51) Int. Cl.
*H01M 2/16*    (2006.01)
*H01M 2/18*    (2006.01)
*H01M 6/14*    (2006.01)
*H01M 2/14*    (2006.01)

(52) U.S. Cl.
CPC ......... *H01M 2/1653* (2013.01); *H01M 2/145* (2013.01); *Y10T 29/49108* (2015.01)

(58) Field of Classification Search
USPC ........................................ 429/163, 179, 246
See application file for complete search history.

(56) References Cited

U.S. PATENT DOCUMENTS

| | | | | |
|---|---|---|---|---|
| 6,478,829 B1* | 11/2002 | Zguris | ................. | H01M 2/1606 28/104 |
| 2010/0316902 A1* | 12/2010 | Takita | ................... | H01M 2/145 429/129 |
| 2011/0195298 A1* | 8/2011 | Daidoji | ............... | H01M 2/0207 429/153 |
| 2011/0244287 A1* | 10/2011 | Kim | ...................... | H01M 2/021 429/94 |
| 2013/0284531 A1 | 10/2013 | Oonuma et al. | | |

FOREIGN PATENT DOCUMENTS

| CN | 1091227 A | 8/1994 |
|---|---|---|
| CN | 1767253 A | 5/2006 |
| CN | 101246970 A | 8/2008 |

(Continued)

OTHER PUBLICATIONS

Chinese Office Action and English Translation dated Aug. 22, 2016, 13 pages.

(Continued)

*Primary Examiner* — Osei Amponsah
(74) *Attorney, Agent, or Firm* — Foley & Lardner LLP

(57) ABSTRACT

A nonaqueous battery includes at least one positive electrode plate, at least one negative electrode plate and at least one separator formed of a microporous resin film and laminated between the positive electrode plate and the negative electrode plate. The separator has a square or rectangular shape with four sides, two of which are perpendicular to a machine direction of the microporous resin film and have been subjected to heat and the other two of which are parallel to the machine direction of the microporous resin film and have not been subjected to heat.

6 Claims, 3 Drawing Sheets

(56) References Cited

FOREIGN PATENT DOCUMENTS

| | | |
|---|---|---|
| CN | 201663193 U | 12/2010 |
| JP | 55-57262 A | 4/1980 |
| JP | 2001-202985 A | 7/2001 |
| JP | 2006-287176 A | 10/2006 |
| JP | 2012-140002 A | 7/2012 |
| JP | 2012-142144 A | 7/2012 |
| JP | 2013-069432 A | 4/2013 |

OTHER PUBLICATIONS

Japanese Office Action and English translation, Dec. 6, 2016, 6 pages.
Chinese Office Action, dated Mar. 22, 2017, 6 pages.

* cited by examiner

NONAQUEOUS BATTERY

BACKGROUND OF THE INVENTION

The present invention relates to a nonaqueous battery using a battery separator.

There is known a flat type nonaqueous battery in which an alternate laminate of positive electrode plates, negative electrode plates and separators alternately is sealed together with an electrolytic solution in a package of metal-synthetic resin laminate film. As such battery separators, commonly used are those of microporous resin films (e.g. microporous polyolefin films) as disclosed in Japanese Laid-Open Patent Publication No. 2006-287176.

SUMMARY OF THE INVENTION

The microporous resin film has a high tensile strength in a machine direction (MD) but has a low tensile strength in a transverse direction (TD) perpendicular to the machine direction. It is thus likely that, in the case where the battery separators are formed by mechanical cutting of the microporous resin film in the transverse direction, there will occur breakage in the TD cut sides of the battery separators. This means that the TD cut sides of the battery separators are low in durability against external force whereby the battery separators, when used in the battery package, can easily be broken by external force and fail to perform a proper insulator function. The nonaqueous battery deteriorates in performance due to such insulator function failure.

In view of the foregoing, it is an object of the present invention to provide a nonaqueous battery using a battery separator that has high durability against external force.

According to one aspect of the present invention, there is provided a nonaqueous battery comprising at least one positive electrode plate, at least one negative electrode plate and at least one separator formed of a microporous resin film and laminated between the positive electrode plate and the negative electrode plate, wherein the separator has a square or rectangular shape with four sides, two of which are perpendicular to a machine direction of the microporous resin film and have been subjected to heat and the other two of which are parallel to the machine direction of the microporous resin film and have not been subjected to heat.

According to another aspect of the present invention, there is provided a production method of a nonaqueous battery, the nonaqueous battery comprising at least one positive electrode plate, at least one negative electrode plate and at least one separator laminated between the positive electrode plate and the negative electrode plate, the production method comprising: cutting the separator out from a microporous resin film such that the separator has a square or rectangular shape with four sides, two of which are perpendicular to a machine direction of the microporous resin film and the other two of which are parallel to the machine direction of the microporous resin film; and, before, after or during the cutting, applying heat to the two sides of the separators perpendicular to the machine direction.

It is possible according to the present invention to provide the nonaqueous battery in which the battery separator attains improvements in ease and accuracy of lamination and durability against external force.

The other objects and features of the present invention will also become understood from the following description.

DESCRIPTIONS OF THE EMBODIMENTS

Hereinafter, the present invention will be described in detail below with reference to the drawings.

Figure 1:
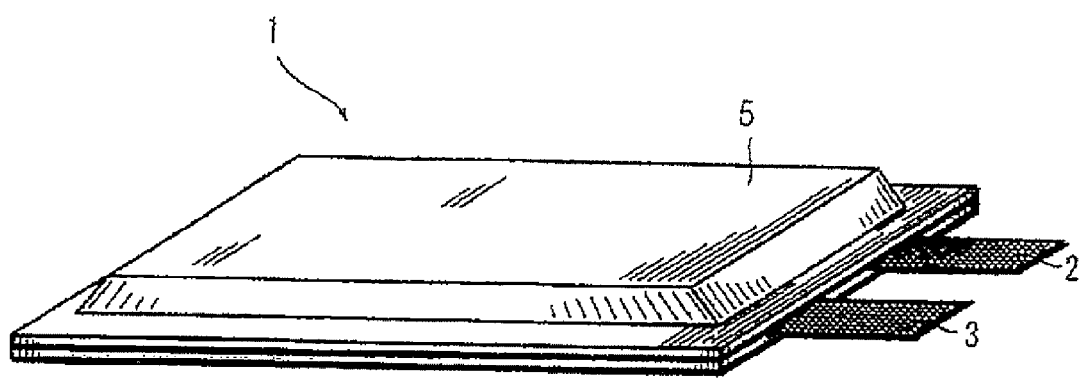
FIG. 1 is a perspective view of a nonaqueous battery with a battery separator according to one embodiment of the present invention.

As shown in FIG. 1, a nonaqueous battery 1 according to one embodiment of the present invention is designed as a lithium-ion secondary battery of flat rectangular appearance.

Figure 2:
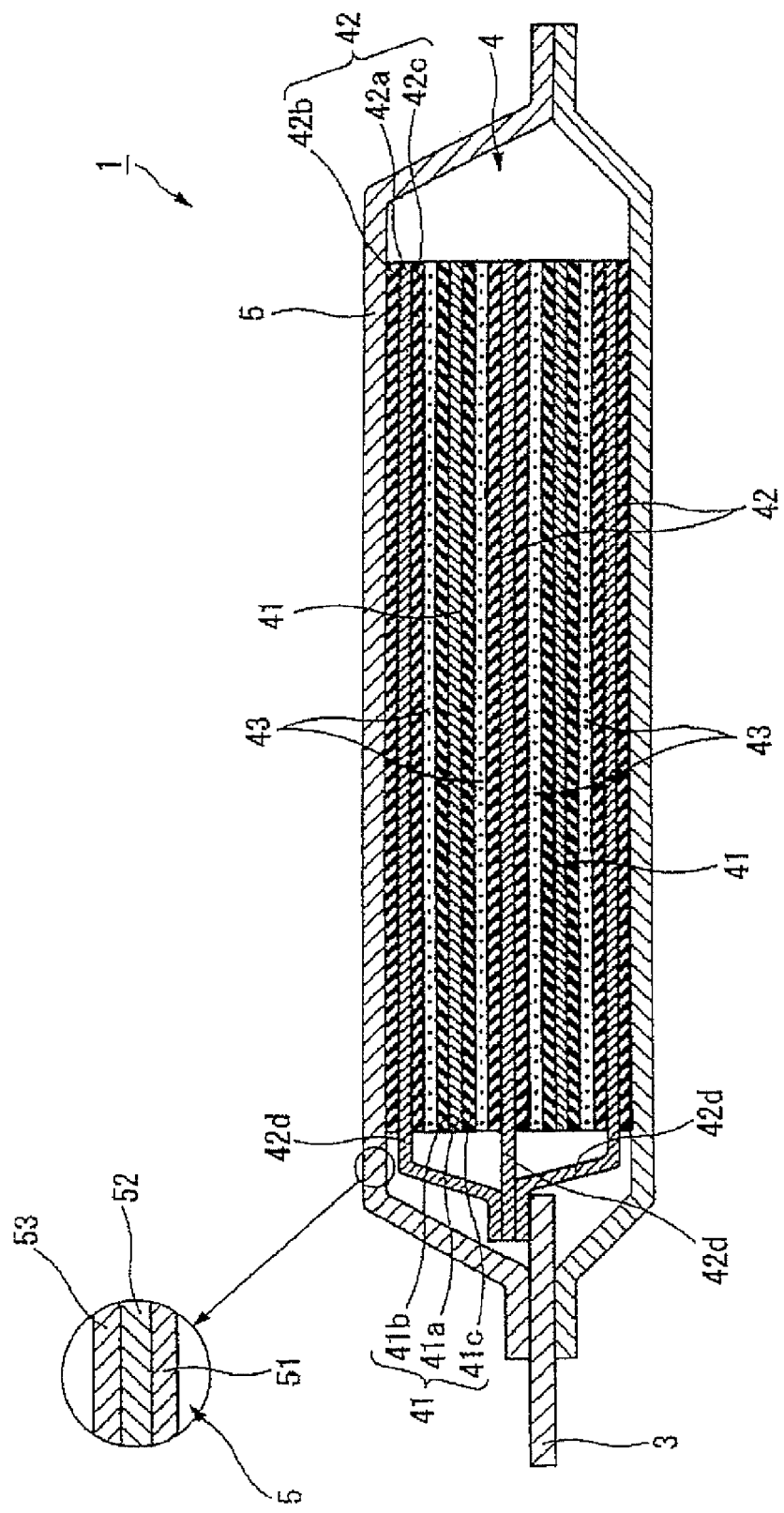
FIG. 2 is a section view of the nonaqueous battery according to the one embodiment of the present invention.

The nonaqueous battery 1 has a rectangular electrode laminate unit 4 as a power generating element sealed together with an electrolytic solution in a battery package 5 as shown in FIG. 2. In FIG. 2, the dimensions of the respective parts and portions may be exaggerated for illustration purposes and may be different from the actual dimensions. As shown in FIGS. 1 and 2, the nonaqueous battery 1 also has a pair of positive and negative electrode terminals 2 and 3 connected to the electrode laminate unit 4 and drawn out from one short side of the battery package 5.

The electrode laminate unit 4 has a plurality of positive and negative electrode plates 41 and 42 alternately laminated together via separators 43. In the present embodiment, three negative electrode plates 42 and two positive electrode plates 41 are alternately laminated to one another, with four separators 43 arranged between respective adjacent ones of these electrode plates 41 and 42, in the electrode laminate unit 43 as shown in FIG. 2. Namely, the negative electrode plates 2 are located on both the outermost sides of the electrode laminate unit 4 in the present embodiment.

Each of the positive electrode plates 41 has a rectangular positive electrode collector 41a and positive electrode active material layers 41b and 41c arranged on opposite main surfaces of the positive electrode collector 41a. The positive electrode collector 41a is formed of an electrochemically stable metal foil such as aluminum foil, aluminum alloy foil, copper foil or nickel foil. The positive electrode active material layers 41b and 41c are formed by mixing a positive electrode active material with a binder etc., and then, applying the resulting mixture to the main surfaces of the positive electrode collector 41a. Typical examples of the positive electrode active material usable for the positive electrode collector 41a are lithium composite oxides such as lithium nickel oxide ($LiNiO_2$), lithium manganese oxide ($LiMnO_2$), lithium cobalt oxide and the like.

Each of the negative electrode plates 42 has a rectangular negative electrode collector 42a and negative electrode active material layers 42b and 42c arranged on opposite main surfaces of the negative electrode collector 42a. The negative electrode collector 42a is formed of an electrochemically stable metal foil such as nickel foil, copper foil, stainless steel foil or iron foil. The negative electrode active material layers 42b and 42c are formed by mixing, with a binder etc., a negative electrode active material capable of absorbing/desorbing lithium ions of the positive electrode material, and then, applying the resulting mixture to the main surfaces of the negative electrode collector 42a. Typical examples of the negative electrode material usable for the negative electrode collector 42a are amorphous carbon, hardly graphitizable carbon, easily graphitizable carbon, graphite and the like.

As shown in FIG. 2, longitudinal end portions of the negative electrode collectors 42a are adapted as extension portions 42d, without the negative electrode active material layers 42b and 42c being applied thereto, and are joined at ends thereof to the negative electrode terminal 3. Similarly, longitudinal end portions of the positive electrode collectors 41a are adapted as extension portions 41d, without the positive electrode active material layers 41b and 41c being applied thereto, and are joined at ends thereof to the positive electrode terminal 2 although not so shown in FIG. 2.

Each of the separators 43 is reactangular-shaped and formed of a microporous resin film so as to perform the function of preventing short-circuit between the positive and negative electrode plates 41 and 42 and holding therein the electrolytic solution. Typical examples of the microporous resin film usable for the separator 43 are those of polyolefins such as polyethylene (PE), polypropylene (PP) and the like. The microporous resin film is not limited to the single-layer film. It is alternatively feasible to use, as the microporous resin film, e.g. a three-layer film in which a polypropylene film is sandwiched between polyethylene films. As the material of the separators 43, the microporous resin film is preferably of the type capable of being melted during thermal cutting or heat application as will be explained later.

There is no particular limitation on the electrolytic solution. The electrolytic solution can be any electrolyte commonly used for lithium-ion secondary batteries. One typical example of the electrolytic solution is a nonaqueous electrolytic solution of a lithium salt in an organic solvent.

It is herein noted that the electrode laminate unit 4 (electrode plate 41, 42; separator 43) may alternatively be formed into a square shape although the electrode laminate unit 4 (electrode plate 41, 42; separator 43) has a rectangular shape as mentioned above in the present embodiment. The expression "the separator 43 has a square or rectangular shape" includes the case where the separator 43 is strictly square or rectangular in shape as viewed in a thickness direction of the microporous resin film but also the case where the separator 43 is substantially square or rectangular in shape as viewed in the thickness direction of the microporous resin film (e.g. the separator 43 has a dimensional error or has a protruding portion or recessed portion formed on an end thereof or fine notches formed on a surface thereof).

The battery package 5 is formed of a laminate film. In the present embodiment, the laminate film has a three-layer structure in which a heat seal layer 51 (as an inner layer), a metal layer 52 (as an intermediate layer) and a protection layer 53 (as an outer layer) are laminated together. The metal layer 52 is formed of e.g. an aluminum alloy. The heat seal layer 51 is formed of a heat-sealable synthetic resin such as polypropylene (PP) so as to cover an inner surface of the metal layer 52. The protection layer 53 is formed of a high-durability synthetic resin such as polyethylene terephthalate (PET) so as to cover an outer surface of the metal layer 52. Although two synthetic resin layers 51 and 53 are laminated on both the inner and outer surfaces of the metal layer 52 in the present embodiment, the outer synthetic resin layer 53 is not necessarily provided on the metal layer 52. The laminate film may alternatively have a two-layer structure in which the synthetic resin layer 51 is provided only on the inner surface of the metal layer 52. As another alternative, the laminate film may have a multilayer structure of four or more layers. In the present embodiment, the battery package 5 is formed by overlaying two sheets of the laminate film and heat sealing four peripheral sides of the overlaid laminate film sheets as shown in FIGS. 1 and 2. It is alternatively feasible to form the battery package 5 by holding a relatively large sheet of the laminate film into two leaves and heat sealing three peripheral edges of the folded laminate film sheet.

The positive and negative electrode terminals 2 and 3 are each formed of a conductive metal foil and drawn out through the sealed faces of the laminate film sheets of the battery package 5.

The above-structured nonaqueous battery 1 can be produced by the following procedure. First, the negative electrode plates 42, the separator 43 and the positive electrode plates 41 are alternately laminated to one another. Then, the extension portions 41d and 42d of the positive and negative electrode collectors 41a and 42a of the positive and negative electrode plates 41 and 42 are joined by spot welding to the positive and negative electrode terminals 2 and 3, respectively. The thus-obtained electrode laminate unit 4 is placed in the battery package 5, with the positive and negative electrode terminals 2 and 3 drawn out from the battery package 5, by sandwiching the electrode laminate unit 4 between the laminate film sheets and heat sealing the peripheral sides of the laminate film sheets. At this time, there remains a relatively small charge port unsealed. The electrolytic solution is charged into the battery package 5 through the charge port. Finally, the battery package 5 is closed by heat sealing the charge port. In this way, the nonaqueous battery 1 is completed.

Figure 3:
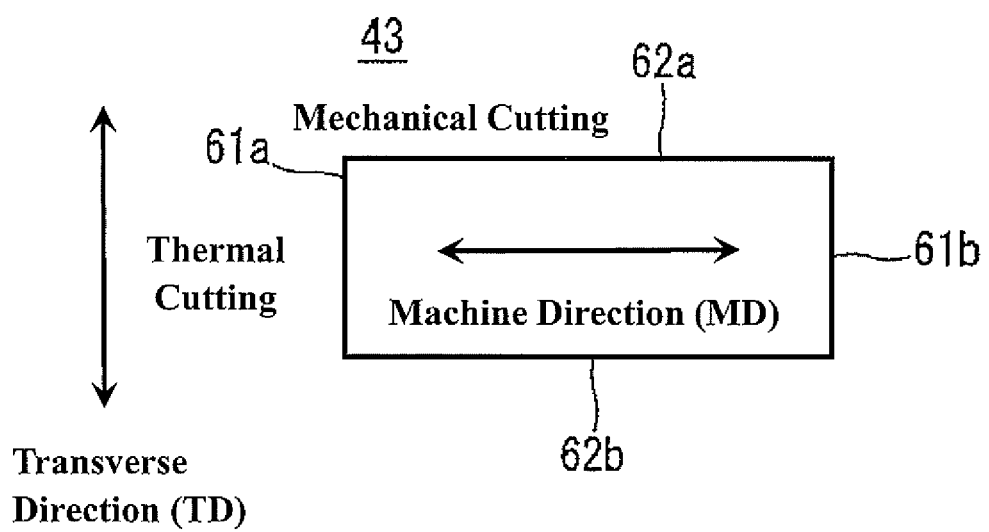
FIG. 3 is a schematic section view of the battery separator according to the one embodiment of the present invention.

The separators 43 can be formed into a rectangular shape by cutting the microporous resin film at predetermined intervals parallel to its machine direction (MD), and then, cutting the resulting film strip at predetermined intervals parallel to its transverse direction (TD) perpendicular to the machine direction (MD) as shown in FIG. 3. As a result, each of the separators 43 has four cut sides: two longer cut sides 62a and 62b being parallel to the machine direction (sometimes referred to as "MD sides") and two shorter cut sides 61a and 61b being perpendicular to the machine direction i.e. parallel to the transverse direction (sometimes referred to as "TD side"). The TD sides 61a and 61b of the separators 43 correspond to the left and right sides in FIG. 2, respectively. Hereinafter, the sides of any other structural parts extending in directions parallel to the machine direction and to the transverse direction are also sometimes referred to as "MD side" and "TD side", respectively, for simplification/explanation purposes.

In one preferred embodiment, the MD sides 62a and 62b of the separators 43 (microporous resin film) are formed by mechanical cutting with the use of e.g. a cutter and are thus made straight without being subjected to heat. It is therefore possible to use these straight MD sides 62a and 62b of the separators 43 as a reference for proper alignment/positioning of the positive and negative electrode plates 41 and 42 and the separators 43 during the formation of the electrode laminate unit 4 and improve the lamination accuracy of the positive and negative electrode plates 41 and 42. It is also possible by such lamination accuracy improvement to prevent the nonaqueous battery 1 from deteriorating in capacity due to misalignment of the positive and negative electrode plates 41 and 42.

On the other hand, the TD sides 61a and 61b of the separators 43 (microporous resin film) are formed by thermal cutting e.g. with the irradiation of a laser light. The temperature of the laser light is set to e.g. about 170° C. in the case where the microporous resin film is of polyolefin. By the thermal cutting, these TD sides 61a and 61b of the separators 43 (microporous resin film) are subjected to heat and melted to close pores therein. The number of pores in the TD sides 61a and 61b of the separators 43 becomes less than the number of pores in the MD sides 62a and 62b of the separators 43. It is therefore possible to improve the durability of the TD sides 61a and 61b of the separators 43 against external force and prevent the occurrence of breakage in the TD sides 61a and 61b of the separators 43 so that the separators 43 can perform the insulator function properly without causing deterioration in the performance of the nonaqueous battery 1.

In the case where the nonaqueous battery is of winding type, it is common practice to fasten the cut sides of the separators with a tape whereby there is no need for the cut sides of the separators to secure durability against external force. The above effects of the separators 43 are more pronounced in the case where the nonaqueous battery 1 is of flat (laminated) type equipped with the electrode laminate unit 4 as in the present embodiment.

In the case where the positive and negative electrode terminals are connected to the opposite TD side parts of the electrode laminate unit and drawn out from the opposite TD side parts of the battery package, the electrode laminate unit is fixed by both the TD side parts of the battery package and prevented from being displaced within the battery package. In the present embodiment, by contrast, the positive and negative electrode terminals 2 and 3 are connected to one of the TD side parts of the electrode laminate unit 4 (consistent with the TD sides 61a of the separators 43) and drawn out from the corresponding one TD side part of the battery package 5. The electrode laminate unit 4 is thus fixed only by the TD side 61a part of the battery package 5 and is prevented from being displaced in a direction from the TD sides 61a toward the TD sides 61b of the separators 43 but not prevented from being displaced in a direction from the TD sides 61b toward the TD sides 61a of the separators 43. In this case, there is a possibility of the occurrence of breakage in the TD sides 61a of the separators 43 if the TD sides 61a of the separators 43 are brought into contact with the positive and negative electrode terminals 2 and 3 by displacement of the electrode laminate unit 4 upon the application of an external force to the TD side 61b part of the battery package 5. However, the TD sides 61a of the separators 43 are protected from breakage by contact with the positive and electrode terminals 2 and 3 as the TD sides 61a and 61b of the separators 43 are improved in durability against external force by the action of thermal cutting as mentioned above in the present embodiment. Accordingly, the separators 43 can perform the insulator function properly without causing deterioration in the performance of the nonaqueous battery 1.

Although the TD sides 61a and 61b of the separator 43 are subjected to heat during the cutting in the above preferred embodiment, it is another preferred embodiment to apply heat to the TD sides 61a and 61b of the separator 43 (microporous resin film) after the cutting while forming the TD sides 62a and 62b of the separator 43 (microporous resin film) by mechanical cutting. For example, it is feasible to laminate the positive and negative electrode plates 41 and 42 and the separators 43 into the electrode laminate unit 4 by alignment of the MD sides 62a and 62b of the separators 43, and then, apply heat to the TD sides of the electrode laminate unit 4 with the use of e.g. a heater.

It is alternatively feasible to form the separator 43 by applying heat to the TD cutting sites of the microporous resin film and cutting the microporous resin film along the TD cutting sites after the heat application.

The heat application is preferably performed until the TD sides 61a and 61b of the separator 43 (microporous resin film) become transparent. This allows sufficient melting of the TD sides 61a and 61b of the separator 43 (microporous resin film) for improvement in durability against external force.

The entire contents of Japanese Patent Application No. 2013-120545 (filed on Jun. 7, 2013) are herein incorporated by reference.

Although the present invention has been described with reference to the above exemplary embodiments, the present invention is not limited to these exemplary embodiments. Various modification and variation of the embodiments described above will occur to those skilled in the art in light of the above teachings. The scope of the present invention is defined with reference to the following claims.

What is claimed is:

1. A nonaqueous battery comprising:
   at least one positive electrode plate;
   at least one negative electrode plate; and
   at least one separator laminated between the positive electrode plate and the negative electrode plate,
   wherein the separator is formed of a microporous resin film that is cut into a square or rectangular shape having two cut sides perpendicular to a machine direction of the microporous resin film and two cut sides parallel to the machine direction of the microporous resin film,
   wherein the two cut sides of the separator perpendicular to the machine direction are formed by thermal cutting and thereby subjected to heat during cutting,
   wherein the two cut sides of the separator parallel to the machine direction are formed by mechanical cutting and thereby not subjected to heat during cutting, and
   wherein a number of pores in the two cut sides of the separator perpendicular to the machine direction is less than a number of pores in the two cut sides of the separator parallel to the machine direction.

2. The nonaqueous battery according to claim 1, wherein the two cut sides of the separator perpendicular to the machine direction are subjected to heat after cutting.

3. The nonaqueous battery according to claim 1, wherein the two cut sides of the separator perpendicular to the machine direction are subjected to heat until becoming transparent.

4. A nonaqueous battery comprising:
   an electrode laminate unit having a plurality of positive electrode plates, a plurality of negative electrode plates and a plurality of separators, the plurality of positive electrode plates and the plurality of negative electrode plates alternately laminated, with one of the plurality of separators therebetween, as a power generating element; and
   a battery package formed of a laminate film and accommodating therein the electrode laminate unit,
   wherein each of the separators is formed of a microporous resin film that is cut into a square or rectangular shape having two cut sides perpendicular to a machine direction of the microporous resin film and two cut sides parallel to the machine direction of the microporous resin film,
   wherein the two cut sides of the separator perpendicular to the machine direction are formed by thermal cutting and thereby subjected to heat during cutting,
   wherein the two cut sides of the separator parallel to the machine direction are formed by mechanical cutting and thereby not subjected to heat during cutting, and
   wherein a number of pores in the two cut sides of the separator perpendicular to the machine direction is less than a number of pores in the two cut sides of the separator parallel to the machine direction.

5. The nonaqueous battery according to claim 4, further comprising positive and negative electrode terminals connected to the positive electrode plates and the negative electrode plates, respectively, and drawn out from one side of the battery package extending in a direction parallel to the machine direction.

6. A production method of the nonaqueous battery according to claim 1, comprising:
- providing the at least one positive electrode plate;
- providing the at least one negative electrode plate; and
- cutting the at least one separator out from the microporous resin film such that the at least one separator has a square or rectangular shape having two cut sides perpendicular to the machine direction of the microporous resin film and two cut sides parallel to the machine direction of the microporous resin film,
- wherein the two cut sides of the separator perpendicular to the machine direction are formed by thermal cutting and thereby subjected to heat during the cutting,
- wherein the two cut sides of the separator parallel to the machine direction are formed by mechanical cutting and thereby not subjected to heat during the cutting,
- wherein after or during the cutting, heat is not applied to the two cut sides of the at least one separator parallel to the machine direction, and
- wherein a number of pores in the two cut sides of the separator perpendicular to the machine direction is less than a number of pores in the two cut sides of the separator parallel to the machine direction.

\* \* \* \* \*